(12) United States Patent
Lewandowski

(10) Patent No.: US 11,262,433 B2
(45) Date of Patent: Mar. 1, 2022

(54) METHOD FOR OPERATING A SENSOR ARRANGEMENT IN A MOTOR VEHICLE ON THE BASIS OF A DSI PROTOCOL

(71) Applicant: Valeo Schalter und Sensoren GmbH, Bietigheim-Bissingen (DE)

(72) Inventor: Marek Lewandowski, Bietigheim-Bissingen (DE)

(73) Assignee: Valeo Schalter und Sensoren GmbH, Bietigheim-Bissingen (DE)

(*) Notice: Subject to any disclaimer, the term of this patent is extended or adjusted under 35 U.S.C. 154(b) by 81 days.

(21) Appl. No.: 16/637,469

(22) PCT Filed: Aug. 9, 2018

(86) PCT No.: PCT/EP2018/071611
§ 371 (c)(1),
(2) Date: Feb. 7, 2020

(87) PCT Pub. No.: WO2019/034520
PCT Pub. Date: Feb. 21, 2019

(65) Prior Publication Data
US 2020/0249312 A1 Aug. 6, 2020

(30) Foreign Application Priority Data
Aug. 15, 2017 (DE) ............ 10 2017 118 565.8

(51) Int. Cl.
*G01S 7/00* (2006.01)
*G01S 15/931* (2020.01)
(Continued)

(52) U.S. Cl.
CPC ............ *G01S 7/003* (2013.01); *G01S 15/931* (2013.01); *H04J 3/06* (2013.01); *H04Q 9/04* (2013.01); *H04L 2012/40273* (2013.01)

(58) Field of Classification Search
CPC .......... G01S 7/003; G01S 15/931; H04J 3/06; H04Q 9/04; H04L 2012/40273
See application file for complete search history.

(56) References Cited

U.S. PATENT DOCUMENTS

| 6,081,188 | A | | 6/2000 | Kutlucinar et al. |
| 6,125,454 | A | * | 9/2000 | Mossner ................ G06F 11/00 714/4.4 |

(Continued)

FOREIGN PATENT DOCUMENTS

| CN | 101662404 A | * | 3/2010 |
| CN | 101662404 B | * | 10/2012 |

(Continued)

OTHER PUBLICATIONS

Notice of Reason for Rejection issued in corresponding Japanese Patent Application No. 2020-508613, dated Apr. 2, 2021 (4 pages).
(Continued)

*Primary Examiner* — Eric Nowlin
(74) *Attorney, Agent, or Firm* — Osha Bergman Watanabe & Burton LLP

(57) ABSTRACT

A method for operating a sensor arrangement in a motor vehicle on the basis of a DSI protocol is disclosed. The sensor arrangement has a central unit as a master and a plurality of sensor units, each having a receiver as slaves controlled by the master. The central unit and the sensor units are connected to a bus line and via the bus cable a communication takes place between the central unit and the sensor units. The method includes selecting a first group of sensor units by the central unit for a first measurement, assigning a first time slot or first time slots within a first cycle respectively to one of the sensor units from the first
(Continued)

Figure 1:
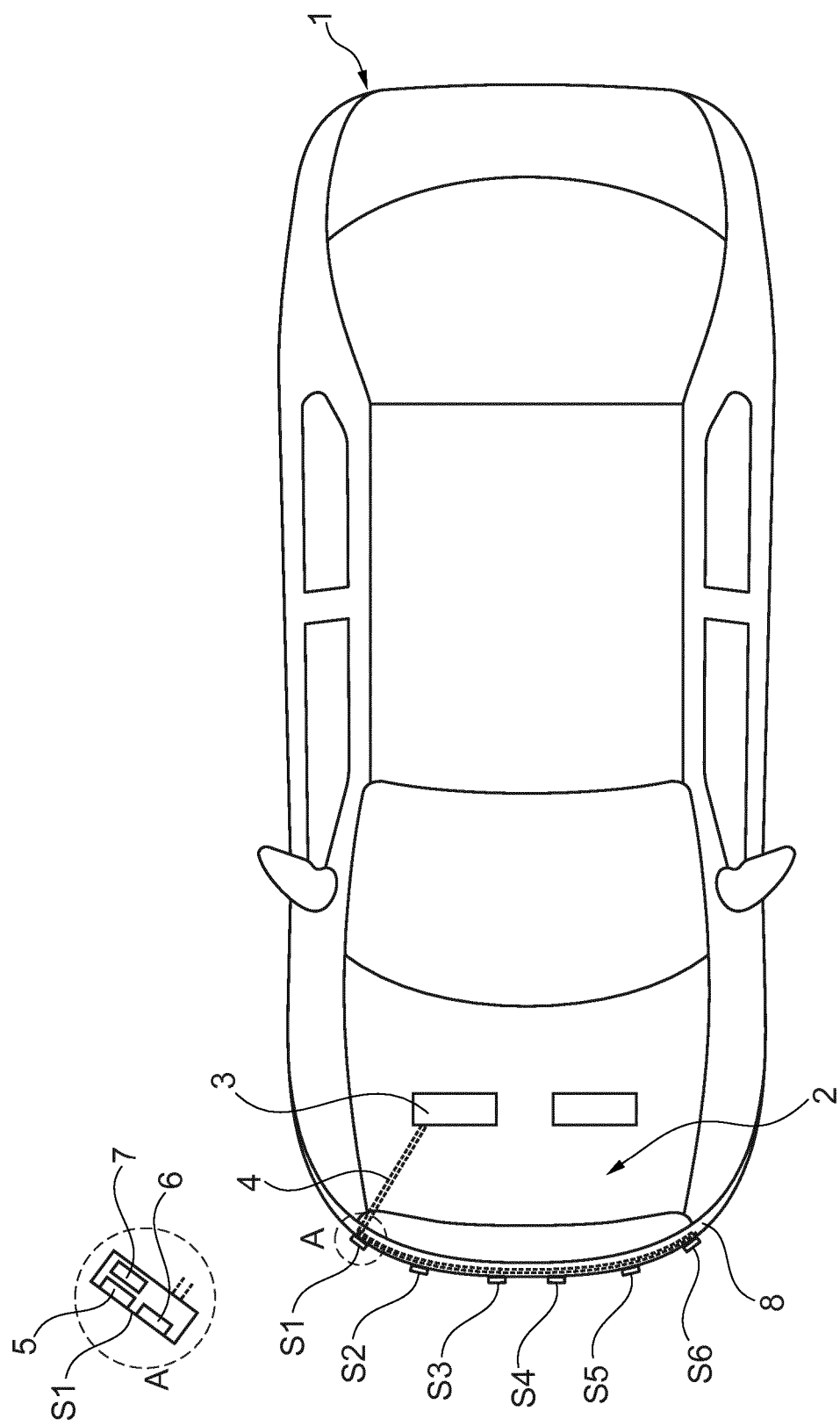

group by means of the central unit, and broadcasting corresponding first time slot information from the central unit to the sensor units.

11 Claims, 2 Drawing Sheets

(51) Int. Cl.
    *H04J 3/06*     (2006.01)
    *H04Q 9/04*     (2006.01)
    *H04L 12/40*     (2006.01)

(56) References Cited

U.S. PATENT DOCUMENTS

| | | | | |
|---|---|---|---|---|
| 7,171,573 | B2* | 1/2007 | Scheele | H04J 3/0664 713/375 |
| 7,174,402 | B2* | 2/2007 | Ellerbrock | H04L 12/403 710/112 |
| 7,301,477 | B2* | 11/2007 | Isoyama | H04Q 9/00 340/870.13 |
| 7,385,478 | B2* | 6/2008 | Martin | G08B 25/14 340/286.01 |
| 7,487,229 | B2* | 2/2009 | Ohly | H04J 3/0664 702/186 |
| 7,707,339 | B2* | 4/2010 | Pigott | G06F 13/4291 710/110 |
| 8,135,893 | B2* | 3/2012 | Brindle | G06F 13/372 710/117 |
| 8,438,419 | B2* | 5/2013 | Bernon-Enjalbert | H04L 12/403 714/4.5 |
| 8,504,748 | B2* | 8/2013 | Matsuo | H04L 12/403 710/110 |
| 8,565,104 | B2* | 10/2013 | Miyata | G05B 19/042 370/252 |
| 8,601,185 | B2* | 12/2013 | Sandhu | G16H 40/63 710/61 |
| 8,612,657 | B2* | 12/2013 | Lance | G06F 13/364 710/110 |
| 8,644,791 | B2* | 2/2014 | Link | H04L 12/40045 455/402 |
| 8,762,612 | B2* | 6/2014 | Sugiura | H04L 12/403 710/110 |
| 9,292,409 | B2* | 3/2016 | Hammerschmidt | G06F 11/36 |
| 9,883,298 | B2* | 1/2018 | Solum | H04W 4/80 |
| 10,079,650 | B2* | 9/2018 | Aichriedler | H04J 3/0638 |
| 10,286,867 | B2* | 5/2019 | Bracalente | B60R 21/0132 |
| 10,455,368 | B2* | 10/2019 | Ylamurto | H04W 4/70 |
| 10,581,543 | B2* | 3/2020 | Aichriedler | H04Q 9/04 |
| 10,650,621 | B1* | 5/2020 | King | H04L 67/10 |
| 10,713,199 | B2* | 7/2020 | Amarilio | G06F 3/162 |
| 10,756,925 | B2* | 8/2020 | Hustava | H04B 15/04 |
| 10,820,173 | B2* | 10/2020 | Stitt | H04W 4/80 |
| 10,929,324 | B2* | 2/2021 | Johnson | G06F 13/4004 |
| 11,030,902 | B2* | 6/2021 | Bakhishev | G06N 20/00 |
| 11,057,831 | B2* | 7/2021 | Mirfakhraei | H04L 67/12 |
| 2003/0128702 | A1* | 7/2003 | Satoh | G06F 13/37 370/390 |
| 2004/0199691 | A1* | 10/2004 | Ellerbrock | H04L 12/403 710/112 |
| 2005/0055469 | A1* | 3/2005 | Scheele | H04J 3/0664 713/375 |
| 2005/0122233 | A1* | 6/2005 | Isoyama | H04W 52/0248 340/870.11 |
| 2005/0197753 | A1* | 9/2005 | Miura | H04Q 9/00 701/45 |
| 2006/0039408 | A1* | 2/2006 | Wortel | G06F 13/4282 370/470 |
| 2007/0266119 | A1* | 11/2007 | Ohly | H04J 3/0664 709/220 |
| 2008/0080312 | A1* | 4/2008 | Eperjesi | G01V 1/223 367/79 |
| 2008/0084279 | A1* | 4/2008 | Martin | G08B 25/14 340/286.01 |
| 2008/0267181 | A1* | 10/2008 | Monga | H04L 45/16 370/390 |
| 2009/0105850 | A1* | 4/2009 | Miyata | H04L 12/40169 700/28 |
| 2009/0157929 | A1* | 6/2009 | Pigott | G06F 13/4291 710/110 |
| 2010/0070666 | A1* | 3/2010 | Brindle | H04L 12/417 710/117 |
| 2011/0093739 | A1* | 4/2011 | Bernon-Enjalbert | H04L 25/028 714/4.5 |
| 2011/0125945 | A1* | 5/2011 | Link | H04L 12/10 710/110 |
| 2011/0138090 | A1* | 6/2011 | Lance | H04L 25/4902 710/110 |
| 2011/0185093 | A1* | 7/2011 | Matsuo | H04L 61/2038 710/110 |
| 2011/0208886 | A1* | 8/2011 | Sugiura | H04L 12/403 710/110 |
| 2012/0017013 | A1* | 1/2012 | Sandhu | G16H 40/63 710/61 |
| 2012/0210154 | A1* | 8/2012 | Hartwich | H04L 12/40039 713/323 |
| 2012/0221753 | A1* | 8/2012 | Hartwich | H04L 12/40039 710/107 |
| 2013/0317701 | A1 | 11/2013 | Ooyabu | |
| 2014/0358377 | A1 | 12/2014 | Hammerschmidt et al. | |
| 2016/0223370 | A1* | 8/2016 | Levy | G01D 18/00 |
| 2017/0016366 | A1 | 1/2017 | Suzawa et al. | |
| 2017/0127410 | A1* | 5/2017 | Ylamurto | H04W 4/06 |
| 2017/0171673 | A1* | 6/2017 | Solum | H04R 25/558 |
| 2017/0294805 | A1* | 10/2017 | Remillard | H04W 52/04 |
| 2018/0370471 | A1* | 12/2018 | Bracalente | B60R 21/0132 |
| 2018/0373659 | A1* | 12/2018 | Amarilio | G06F 3/162 |
| 2019/0347231 | A1* | 11/2019 | Johnson | H04L 49/3054 |
| 2020/0135028 | A1* | 4/2020 | Bakhishev | G08G 1/042 |
| 2020/0153653 | A1* | 5/2020 | Hustava | H04B 15/04 |
| 2020/0176976 | A1* | 6/2020 | Lewandowski | H04L 12/40 |
| 2020/0241130 | A1* | 7/2020 | Lewandowski | G08C 19/00 |
| 2020/0249312 | A1* | 8/2020 | Lewandowski | G01S 15/931 |
| 2020/0273268 | A1* | 8/2020 | Bhattacharyya | H04L 12/40169 |
| 2020/0322703 | A1* | 10/2020 | Bures | G06N 20/00 |
| 2020/0359312 | A1* | 11/2020 | Mirfakhraei | H04W 4/38 |
| 2021/0018528 | A1* | 1/2021 | Tomago | G01D 9/00 |
| 2021/0025944 | A1* | 1/2021 | Park | H04W 4/38 |
| 2021/0209044 | A1* | 7/2021 | Johnson | H04L 49/30 |
| 2021/0288736 | A1* | 9/2021 | Guignard | H04J 3/0667 |

FOREIGN PATENT DOCUMENTS

| | | | |
|---|---|---|---|
| CN | 107454123 A | * 12/2017 | |
| DE | 10 2012 103907 A1 | 11/2013 | |
| DE | 10 2014 107689 A1 | 12/2014 | |
| DE | 10 2013 226376 A1 | 6/2015 | |
| DE | 10 2016 223835 A1 | 6/2017 | |
| EP | 2263102 A1 | 12/2010 | |
| EP | 2263102 B1 | 8/2013 | |
| EP | 2811695 A1 | 12/2014 | |
| EP | 3758303 A1 * | 12/2020 | G01R 31/396 |
| EP | 3758303 A4 * | 6/2021 | H04L 12/403 |
| JP | 2013-098992 A | 5/2013 | |
| WO | WO-2007079280 A2 * | 7/2007 | H04L 45/00 |
| WO | WO-2007079280 A3 * | 12/2007 | H04L 45/22 |
| WO | 2009109243 A1 | 9/2009 | |
| WO | 2016054345 A1 | 4/2016 | |
| WO | WO-2018149908 A1 * | 8/2018 | G01S 13/931 |

OTHER PUBLICATIONS

Denso Corporation, freescale TM semiconductor Inc., TRW Automotive Inc.: "DSI3 Bus Standard", Feb. 16, 2011 (Feb. 16, 2011), pp. 1-45, http://www.dsiconsortium.org/downloads/DSI3_%20Bus_Standard_r1.00.pdf, XP055510946 (45 pages).

(56) References Cited

OTHER PUBLICATIONS

International Search Report and Written Opinion in corresponding International Application No. PCT/EP2018/071611, dated Oct. 16, 2018 (15 pages).
German Search Report in corresponding German Application No. 10 2017 118 565.8, dated May 17, 2017 (10 pages).

* cited by examiner

METHOD FOR OPERATING A SENSOR ARRANGEMENT IN A MOTOR VEHICLE ON THE BASIS OF A DSI PROTOCOL

The invention relates to a method for operating a sensor arrangement in a motor vehicle on the basis of a DSI protocol, wherein the sensor arrangement has a central unit as a master and a multiplicity of sensor units each comprising a receiver as slaves controlled by the master, the central unit and the sensor units are connected to a bus cable and communication between the central unit and the sensor units takes place via the bus cable. The invention also relates to the use of such a method in a motor vehicle, and to such a motor vehicle.

The DSI Protocol Distributed System Interface, see: DSI3 Bus Standard, Revision 1.00 dated 16 Feb. 2011, the specification of which hereby forms part of the disclosure of the present invention by explicit incorporation, is a protocol that allows a sensor network to be built on the basis of a simple two-wire cable arrangement, in which a master communicates with one or more slaves via a two-wire bus cable. The DSI protocol is based primarily on the use in motor vehicles, in order by means of the master to poll and/or control a multiplicity of slaves, in particular sensors and actuators.

The specification of the DSI protocol stipulates that such a sensor arrangement can be operated in one of two operational classes, these being on the one hand the "Signal Function Class" and on the other hand the "Power Function Class". The protocol also stipulates essentially three different modes in which the bus can be used between the master and the slaves:

In the CRM mode (Command and Response mode) a bi-directional communication takes place between the master and the slaves. The master sends a command (Command), to which the slaves respond (Response). This method is used, for example, to configure the slaves or to query specific values from a slave selectively.

In the PDCM mode (Periodic Data Collection mode) the slaves transfer comparatively large amounts of data to the master within a specified time slot, wherein the transmission activity of the master is confined to providing the slaves a reference point for determining this time slot by means of a synchronisation signal (Broadcast Read Command). The slaves have already been equipped with information about their respective time slot in advance, so that in response to the synchronisation signal they determine their respective transmission time interval, on the basis of which they can send their sensor data to the master.

In the power supply phase, relatively large amounts of electrical energy are transferred in order to supply the slaves with high energy consumption with sufficient energy.

The above-mentioned Signal Function Class in accordance with the above-mentioned specification is used primarily for the connection of slaves with low energy consumption and relatively high data traffic, which is to be sent from the slave to the master. After commissioning a sensor arrangement of the Signal Function Class a first phase of the communication takes place between the master and the slave in the CRM mode, during which the slave is usually configured, for example in relation to the parameters of the above-mentioned PDCM time slot for this slave. Once this phase is completed, the sensor arrangement thus changes over into the PDCM mode, in which the slaves always transmit the acquired data to the central entity in the respectively assigned time slot in response to the synchronisation signal of the master. This phase in the PDCM mode is usually not exited again until the operation of the sensor arrangement is interrupted. A power-phase is not provided in accordance with the Signal Function Class, and on account of the low energy consumption of the slaves nor is it required.

The above-mentioned Power Function Class is used primarily for the connection of slaves with relatively high energy consumption and relatively low data traffic, which is to be sent from the master to the slave. In the operation of a sensor arrangement of the Power Function class, phases of the communication between the master and the slave in the CRM mode on the one hand take place alternately with power supply phases on the other hand. The durations of the power phases usually greatly predominate. Supplying a comparatively large amount of energy to the slaves in these phases at a higher voltage compared to the CRM mode means, in particular, that actuators can be operated, wherein this is usually carried out on the basis of control commands transmitted previously from the master to the slave in the CRM phase. The PDCM mode is not applicable in accordance with the Power Function class, because with the above-mentioned actuators, due to low data volume it is also not required.

In the PDCM mode, the data transmission follows a fixed schema, specified by the master. In this context each slave is generally assigned a fixed time slot, i.e. a specified period of time relative to a synchronisation signal emitted by the master, in which data are to be transmitted from the respective slave to the master. Sometimes, however, situations may arise in which a slave does not receive any data at all, or for other reasons it has no data to transmit. Such a time slot assigned to a slave therefore remains empty during the transmission of data from the slaves to the master. In addition, there are other situations in which a time slot assigned to a slave is not sufficient to transfer all the data from this slave to the master. In such situations, a first cycle with time slots for the different slaves must be followed by at least one second cycle in order finally to transfer all of the data from the slaves to the master. The two situations previously described are problematic to the extent that the bandwidth for data transmission from the slaves to the master decreases. This can lead to situations in which not all information is available to the master quickly enough in order, for example, in a driver assistance system in a vehicle to be able to respond adequately to changing ambient conditions.

In WO 2016/054345 A1 an ultrasound system for monitoring the condition or the integrity of a structure is described, such as is used in the oil, gas or power generation industry. The system comprises a multiplicity of ultrasonic sensors and at least one digital sensor interface.

Document DE 10 2013 226 376 A1 describes a method for operating a sensor system with an ultrasonic sensor and a control unit, wherein data from the ultrasonic sensor to the control unit are current-modulated and data from the control unit to the ultrasonic sensor are voltage-modulated. This solution allows, after modification of an appropriate PSIS data bus interface, just such a data bus and a LIN data bus for data transmission to be combined with one another to exploit the advantages of the two bus systems.

In DE 10 2012 103 907 A1 a method is described for operating a receiver unit of a motor vehicle control unit which is connected to a transmitter unit. The receiver unit appends an identifier to the received signal, which contains a virtual address of the transmitter unit. This can be used to connect a sensor unit according to the PSI5 Version1 standard to a motor vehicle control unit which processes signals in the PSI Version2 standard.

Finally, document EP 2 263 102 B1 describes an ultrasound-based driver assistance system having a plurality of sensors. The sensors are each assigned a unique identification code, which can be read out by a control unit via an interface. The interface is a 2-wire bus interface which is designed to comply with a Peripheral Sensor Interface (PSI).

The object of the invention is to specify such a method for operating a sensor arrangement in a motor vehicle on the basis of a DSI protocol, in which a communication between master and slaves with a high bandwidth is normally possible.

This object is achieved by the subjects of the independent patent claims. Preferred extensions of the inventions are described in the dependent claims.

According to the invention therefore, a method for operating a sensor arrangement in a motor vehicle on the basis of a DSI protocol is provided, wherein
  the sensor arrangement has a central unit as a master and a plurality of sensor units each having a receiver as slaves controlled by the master,
  the central unit and the sensor units are connected to a bus cable and
  via the bus cable a communication takes place between the central unit and the sensor units with the following steps:
  selecting a first group of sensor units by means of the central unit for a first measurement, assigning a time slot or multiple time slots within a first cycle respectively to one of the sensor units from the first group by means of the central unit and broadcasting corresponding time slot information from the central unit to the sensor units,
  broadcasting a synchronisation signal from the central unit to the sensor units,
  in response to the synchronisation signal, broadcasting data acquired in each case from a respective sensor unit of the first group to the central unit in the time slot of the first cycle assigned to the respective sensor unit, or in the time slots of the first cycle assigned to the respective sensor unit,
  selecting a second group of sensor units different from the first group by means of the central unit for a second measurement, assigning a time slot or multiple time slots within a second cycle respectively to one of the sensor units from the second group by means of the central unit, and broadcasting corresponding time slot information to the sensor units,
  broadcasting a synchronisation signal from the central unit to the sensor units,
  in response to the synchronisation signal, broadcasting data acquired in each case from a respective sensor unit of the second group to the central unit in the time slot of the second cycle assigned to the respective sensor unit, or in the time slots of the second cycle assigned to the respective sensor unit.

As already stated above, "time slot" as used here means a period of time at a predetermined time interval apart from a synchronisation signal output by the master. In addition, the terms "first group of sensor units" and "second group of sensor units' should be understood to mean that these groups may comprise, on the one hand, a plurality of sensor units but on the other hand, also only a single sensor unit.

It is therefore an essential aspect of the invention that the master selects whichever slaves are assigned time slots for sending data, in other words the time slots are not assigned statically, but dynamically. Specifically, it is thus the case that for a particular measurement not all slaves receive an assigned time slot for sending data. For example, while such a time slot for sending data has been assigned to all slaves during the first measurement, at least one of the slaves is excluded during the second measurement; this slave is thus not assigned a time window for sending data. The first group of sensor units is therefore different from the second group of sensor units: the sensor units that belong to the first group are not the same as the sensor units that belong to the second group. Of course, the groups can include some of the same sensor units. However, it is mandatory that a difference exists between the two groups at least with regard to one sensor unit, this sensor unit thus only belongs to one of the two groups.

In addition, it is also within the scope of the present invention that in assigning the time slots to the slaves not to assign only one time slot to each slave or to assign all slaves the same number of time slots. Rather, the invention allows all slaves which are assigned a time slot to be assigned an individual number of time slots.

In accordance with the invention, there are at least two distinct groups of sensor units. It is also within the scope of the invention, of course, that more than two distinct groups of sensor units may be used. The way in which the sensor units to which a time slot is assigned, or to which time slots are assigned, are preferably selected in each case is described below.

In accordance with a preferred extension of the invention, the method additionally comprises the following steps:
  selecting for the first group only such sensor units from which the central unit expects data for the first measurement, and/or
  selecting for the second group only such sensor units from which the central unit expects data for the second measurement.

This preferred configuration of the invention makes the method particularly effective, because in the assignment of time slots only those sensor units for which the central unit is actually expecting data for the respective measurement are selected. The selection is therefore not carried out in advance of the method, but is carried out in real time, depending on the currently prevailing situation. In this manner, the bandwidth for the data transmission from the sensor units to the central unit is not reduced by the time slots that remain empty, because the sensor units which should have transmitted their data in these time slots have not received any signals at all, and therefore also have no data to transmit.

In accordance with a preferred extension of the invention, the method additionally comprises the following steps:
  at least one repetition of the first cycle and/or
  at least one repetition of the second cycle.

In this way, it is possible to allow for the fact that the data to be transmitted by the sensor units cannot be transmitted completely in a single cycle. Thus, instead of providing very many time slots for this cycle, the respective cycle is repeated once or multiple times. This preferred configuration of the invention, moreover, allows for the situation that a cycle may be temporally limited, so that arbitrarily many time slots cannot be packed into such a cycle.

In accordance with a preferred extension of the invention, the method additionally comprises the following steps:
  assigning such a number of time slots to a respective sensor unit from the first group, which number of time slots is correlated with the volume of data expected by the central unit from the respective sensor unit for the first measurement, and/or assigning such a number of time slots to a respective sensor unit from the second group, which number of time slots is correlated with the volume of data expected by the central unit from the respective sensor unit for the second measurement.

In this way, sensor units from which a particularly large amount of data is expected have a larger number of time slots assigned to them. Of course, it is not possible that the number of time slots is directly proportional to the volume of data, because the time slots can only be assigned discretely, hence if necessary a second time slot must be assigned, although given the amount of remaining data this will not be filled.

Preferably, at least one sensor unit also has a transmitter for broadcasting a signal, and the method additionally has the following steps:
  broadcasting a signal in the first measurement from a sensor unit having a transmitter, and/or
  broadcasting a signal in the second measurement from at least one sensor unit having a transmitter.

In accordance with this preferred configuration of the invention a sensor unit is thus not only equipped with a receiver but also with a transmitter so that the receiver can be used to receive signals broadcast by the transmitter. In addition, of course, a sensor unit can not only receive such signals that originate from a transmitter provided in this sensor unit. Instead, such signals that originate from transmitters of other sensor units can also be received. In addition, in this context it is particularly preferably provided that all sensor units of the sensor arrangement are each equipped with a transmitter.

In this respect, in accordance with a preferred configuration of the invention the following steps are also provided:
  broadcasting the signal in the first measurement from at least one sensor unit that does not belong to the first group, and/or
  broadcasting the signal in the second measurement from at least one sensor unit that does not belong to the second group. This means that a signal is broadcast from such a sensor unit that is not involved in the acquisition of data in the respective measurement.

In principle, the sensor units can have different types of actuators and/or sensors. In accordance with a preferred refinement of the invention, however, the sensor units are designed as ultrasonic sensor units each with an ultrasonic transmitter and an ultrasonic receiver. In this context, the following steps are preferably provided:
  selecting at least one ultrasonic sensor unit by means of the central unit for sending a respective ultrasonic signal for the first measurement,
  sending the respective ultrasonic signal from the selected ultrasonic sensor unit or from the selected ultrasonic sensor units for the first measurement,
  selecting the first group of ultrasonic sensor units by means of the central unit for the first measurement and assigning the number of time slots in each case to one of the ultrasonic sensor units from the first group by the central unit depending on which of the ultrasonic sensor units is expected to receive echo signals as a result of the transmitted ultrasonic signal or as a result of the transmitted ultrasonic signals, and/or
  selecting at least one ultrasonic sensor unit by means of the central unit for sending a respective ultrasonic signal for the second measurement,
  sending the respective ultrasonic signal from the selected ultrasonic sensor unit or from the selected ultrasonic sensor units for the second measurement,
  selecting the second group of ultrasonic sensor units by means of the central unit for the second measurement and assigning the number of time slots in each case to one of the ultrasonic sensor units from the second group by the central unit depending on which of the ultrasonic sensor units is expected to receive echo signals as a result of the transmitted ultrasonic signal or as a result of the transmitted ultrasonic signals.

The invention also comprises the use of a method in a motor vehicle, a sensor arrangement which is configured for operation by means of a previously described method. Preferably it is also provided that the ultrasonic transmitter and the ultrasonic receiver are implemented as the same component, namely that they preferably comprise a diaphragm used for sending and receiving.

Overall, it is true for the invention that the sensor units and the central unit are preferably connected to one another in series via the bus cable, thus in the so-called "daisy-chain" configuration.

In the following, the invention is described in greater detail with reference to the drawings based on preferred exemplary embodiments. The features described can represent an aspect of the invention both individually and in combination.

Figure 2:
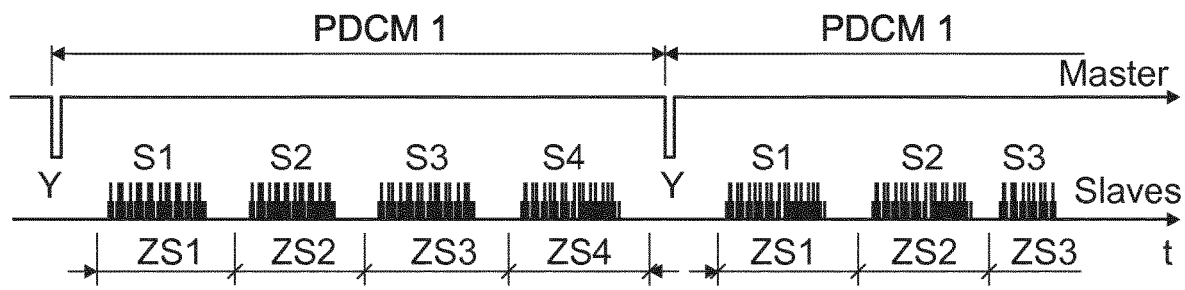
Figure 3:
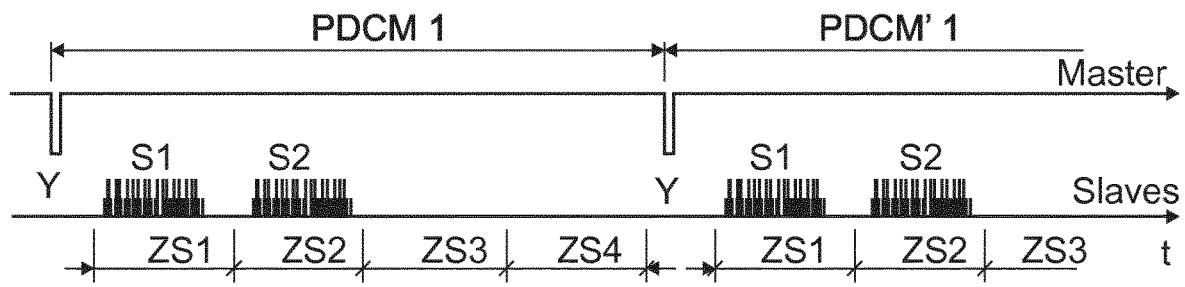
Figure 4:
Figure 5:
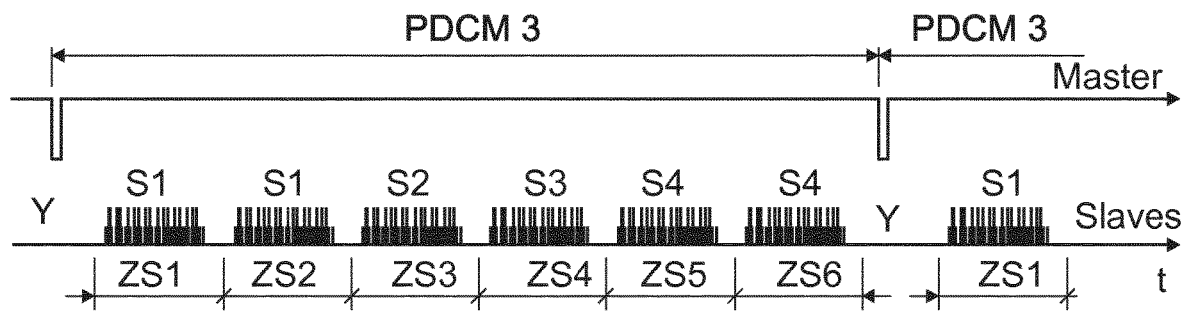

SHOWN ARE:

FIG. 1 a schematic representation of a motor vehicle with a sensor arrangement according to a preferred exemplary embodiment of the invention having a central unit and a plurality of sensor units, FIG. 2 a schematic representation of the communication between the central unit and the sensor units according to the preferred exemplary embodiment of the invention in a first situation, FIG. 3 a schematic representation of a communication, which is not yet modified, between the central unit and the sensor units according to the preferred exemplary embodiment of the invention in a second situation, FIG. 4 a schematic representation of a modified communication between the central unit and the sensor units according to the preferred exemplary embodiment of the invention in the second situation, FIG. 5 a schematic representation of a modified communication between the central unit and the sensor units according to the preferred exemplary embodiment of the invention in a third situation.

FIG. 1 shows a schematic view of a motor vehicle with a sensor arrangement 2 according to a preferred exemplary embodiment of the invention having a central unit 3 and six sensor units S1, S2, S3, S4, S5, S6. This sensor arrangement 2 is part of a driver assistance system with sensor units S1, S2, S3, S4, S5, S6 on the front bumper 8 of the motor vehicle 1. The sensor arrangement 2 is a sensor arrangement 2 with active sensor units S1, S2, S3, S4, S5, S6, thus with sensor units S1, S2, S3, S4, S5, S6, which each combine in themselves a transmitter 5, in this case an ultrasonic transmitter, and a receiver 6, in this case an ultrasonic receiver, as can be identified from the enlarged sensor S1 in the example of FIG. 1. Specifically, the sensor units have a diaphragm, which is used for sending and receiving; the ultrasonic transmitter and ultrasonic receiver are therefore the same component. The reflection of an ultrasonic signal emitted by the transmitter 5 can therefore be received by the receiver 6 of the same sensor unit S1 or else a different sensor unit S2, S3, S4, S5, S6 in order to draw inferences from the reflection about the environment of the vehicle 1.

Within the meaning of the above-mentioned DSI3 specification the central unit 3 represents a master which is connected via the two-wire bus cable 4 to the six sensor units S1, S2, S3, S4, S5, S6 acting as slaves in the sense of the DSI3 specification, so that overall a bus in the sense of the DSI3 specification is present. The bus is operated in the manner described below, so that despite the presence of only two cables both the power supply for the sensor units S1, S2, S3, S4, S5, S6 in the sense of the DSI3 specification as well as a fast and flexible data transfer is guaranteed. The communication necessary for this comprises three different phases for each measurement cycle, which are described in the following.

Within each measurement cycle the first phase is the so-called CRM phase (Command and Response). In this phase, the central unit 3 communicates bidirectionally with the sensor units S1, S2, S3, S4, S5, S6 and in doing so, in particular, issues commands by means of which the sensor units S1, S2, S3, S4, S5, S6 are informed about which of the sensor units S1, S2, S3, S4, S5, S6 must broadcast an ultrasound signal in the relevant measurement cycle. In this CRM phase the sensor units S1, S2, S3, S4, S5, S6 send responses where necessary.

In the directly following second phase the energy is supplied to the sensor units S1, S2, S3, S4, S5, S6 via the bus cable 4, in particular to those sensor units S1, S2, S3, S4, S5, S6 which received the command to broadcast an ultrasonic signal in the first phase. This electrical energy is temporarily stored within an energy storage unit 7 of the sensor units S1, S2, S3, S4, S5, S6, namely in a dedicated condenser.

While the energy transfer via the bus cable 4 is still under way, the relevant sensor units S1, S2, S3, S4, S5, S6 emit an ultrasonic signal via their respective transmitter 5 and supplied from the condenser 7 or supplied directly via the bus cable 4, and depending on the vehicle's surroundings receive the echo signal of said signal, thus the reflection of the emitted ultrasonic signal, and possibly also echo signals from transmitters 5 of the other sensor units S1, S2, S3, S4, S5, S6.

As the third and final phase of the measurement cycle this is followed by the transmission of the data of this echo signal to the central unit 3. This unidirectional transmission is carried out in the PDCM mode (Periodic Data Collection Mode). Such PDCM phases are shown schematically in FIGS. 2 to 5. Shown there schematically as a function of time t are the signals that are emitted by the central unit 3, in other words the master, or by the sensor units S1, S2, S3, S4, S5, S6, in other words the slaves.

A characteristic of this PDCM phase is that unlike in the CRM mode, the central unit 3 does not send commands over the bus to which the addressed sensor units S1, S2, S3, S4, S5, S6 then respond. Instead, the central unit 3 only sends a synchronisation signal Y. This is received by all the sensor units S1, S2, S3, S4, S5, S6 and used as a reference time point.

Each sensor unit S1, S2, S3, S4, S5, S6 has a bus identifier to provide unique addressing in the CRM mode. On the basis of the reference time set by the synchronisation signal the sensor units S1, S2, S3, S4, S5, S6 then determine the time slots ZS1, ZS2, ZS3, ZS4, ZS5, ZS6, which are assigned to their respective bus identifier and in which according to the PDCM mode they then write their data blocks to the bus for transmission to the central unit 3, so that they can be read by the central unit 3 for further processing.

The time slots ZS1, ZS2, ZS3, ZS4, ZS5, ZS6, in which the sensor units S1, S2, S3, S4, S5, S6 respectively exclusively transmit, have been transmitted to them beforehand in the form of a kind of time-slot table within a CRM phase as time intervals relative to the synchronisation signal Y. Each bus identifier can be assigned a certain number of these time slots ZS1, ZS2, ZS3, ZS4, ZS5, ZS6. However, there may also be bus identifiers without an assigned time slot.

FIG. 2 now shows a first situation corresponding to a first measurement, for which the central unit has selected a first group of sensor units which comprises the sensor units S1, S2, S3, S4. Each of these sensor units S1, S2, S3, S4 is assigned exactly one time slot ZS1, ZS2, ZS3, ZS4 respectively in a cycle PDCM1, PDCM2. Such cycles PDCM1, PDCM2 occur in succession, until all the sensor units S1, S2, S3, S4 have transferred their data to the central unit 3. The sensor units S5 and S6 are not assigned any time slots.

In a second situation in accordance with a second measurement it is thus now the case that no echo signals are to be expected from the sensor units S3 and S4 for the vehicle 1. If the allocation of the time slots in this situation were not adjusted this would result in a picture as shown in FIG. 3: while the sensor units S1, S2 in the time slots ZS1, ZS2 each transmit data, the time slots ZS3, ZS4 would remain empty because the sensor units S3, S4 do not receive any signals and, therefore, also have no data to transmit. To counteract a situation such as this and a related loss of bandwidth on the bus, for this second measurement in the second situation another, second group of sensor units is selected, which comprises only the sensor units S1, S2. These sensor units S1, S2 are each assigned exactly one time slot in a cycle PDCM1, PDCM2, PDCM3, as can be seen from FIG. 4. This makes it clear that in this way the full bandwidth of the bus is available again and is not halved, as would have been the case in the situation shown in FIG. 3.

Finally, another such situation is shown schematically in FIG. 5, which corresponds to a third measurement and in which no signals are to be expected from the sensor units S5, S6 and signals are only expected from the sensor units S1, S2, S3, S4. It is also the case in this situation that for the sensor units S1, S4 there is a larger amount of data to be transferred than for the sensor units S2, S3. For this reason, as shown in FIG. 5, the sensor units S2, S3 are each only assigned a single time slot ZS3, ZS4 in a cycle PDCM1, PDCM2, while the sensor units S1, S4 are each assigned two time slots ZS1, ZS2, ZS5, ZS6. The sensor units S5, S6 are assigned no time slots, since no signals are to be expected from these.

In this way, an effective method for operating the sensor arrangement 2 in the motor vehicle 1 on the basis of a DSI protocol is specified, in which a communication between the master and the slaves with a high bandwidth is possible throughout.

LIST OF REFERENCE SIGNS 1 motor vehicle
2 sensor arrangement
3 central unit
4 bus cable
5 transmitter
6 receiver
7 energy store
8 bumper
S1 sensor unit
S2 sensor unit
S3 sensor unit
S4 sensor unit
S5 sensor unit
S6 sensor unit
ZS1 time slot
ZS2 time slot ZS3 time slot
ZS4 time slot
ZS5 time slot
ZS6 time slot
Y synchronisation signal
PDCM1 cycle
PDCM2 cycle
PDCM3 cycle

The invention claimed is:

1. A method for operating a sensor arrangement in a motor vehicle on the basis of a Distributed System Interface(DSI) protocol, wherein
the sensor arrangement has a central unit as a master and a plurality of sensor units, each having a receiver as slaves controlled by the master,
the central unit and the sensor units are connected to a bus line, and via the bus cable a communication takes place between the central unit and the sensor units, the method comprising:
selecting a first group of sensor units by the central unit for a first measurement, assigning a first time slot or first time slots within a first cycle respectively to one of the sensor units from the first group by means of the central unit, and broadcasting corresponding first time slot information from the central unit to the sensor units;
broadcasting a first synchronisation signal from the central unit to the sensor units;
in response to the first synchronisation signal, broadcasting data acquired in each case from a respective sensor unit of the first group to the central unit in the first time slot assigned to the respective sensor unit and/or in the first time slots of the first cycle assigned to the respective sensor unit;
selecting a second group of sensor units different from the first group by means of the central unit for a second measurement, assigning a second time slot or second time slots within a second cycle respectively to one of the sensor units from the second group by means of the central unit, and broadcasting corresponding second time slot information from the central unit to the sensor units;
broadcasting a second synchronisation signal from the central unit to the sensor units; and
in response to the second synchronisation signal, broadcasting data acquired in each case from a respective sensor unit of the second group to the central unit in the second time slot assigned to the respective sensor unit and/or in the second time slots of the second cycle assigned to the respective sensor unit.

2. The method according to claim 1, further comprising:
selecting for the first group only such sensor units from which the central unit expects data for the first measurement; and
selecting for the second group only such sensor units from which the central unit expects data for the second measurement.

3. The method according to claim 1, further comprising:
at least one repetition of the first cycle; and
at least one repetition of the second cycle.

4. The method according to claim 1, further comprising:
assigning a first number of time slots to a first respective sensor unit from the first group, such that the first number of time slots is correlated with a first volume of data expected by the central unit from the first respective sensor unit for the first measurement; and
assigning a second number of time slots to a second respective sensor unit from the second group, such that the second number of time slots is correlated with a second volume of data expected by the central unit from the second respective sensor unit for the second measurement.

5. The method according to claim 1, wherein at least one sensor unit in each case has a transmitter for broadcasting a signal, further comprising:
broadcasting a first measurement signal in the first measurement from at least one sensor unit having a transmitter; and
broadcasting a second measurement signal in the second measurement from at least one sensor unit having a transmitter.

6. The method according to claim 5, further comprising:
broadcasting the first measurement signal in the first measurement from at least one sensor unit that does not belong to the first group; and
broadcasting the second measurement signal in the second measurement from at least one sensor unit that does not belong to the second group.

7. The method according to claim 1, wherein the sensor units are configured as ultrasonic sensor units having an ultrasonic transmitter and an ultrasonic receiver each, further comprising:
selecting at least one ultrasonic sensor unit by means of the central unit for sending a respective ultrasonic signal for the first measurement;
sending the respective ultrasonic signal from the selected ultrasonic sensor unit or from the selected ultrasonic sensor units for the first measurement;
selecting the first group of ultrasonic sensor units by means of the central unit for the first measurement and assigning a first number of time slots in each case to one of the ultrasonic sensor units from the first group by the central unit depending on which of the ultrasonic sensor units is expected to receive echo signals as a result of the transmitted ultrasonic signal or as a result of the transmitted ultrasonic signals; and
selecting at least one ultrasonic sensor unit by means of the central unit for sending a respective ultrasonic signal for the second measurement;
sending the respective ultrasonic signal from the selected ultrasonic sensor unit or from the selected ultrasonic sensor units for the second measurement; and
selecting the second group of ultrasonic sensor units by means of the central unit for the second measurement and assigning a second number of time slots in each case to one of the ultrasonic sensor units from the second group by the central unit depending on which of the ultrasonic sensor units is expected to receive echo signals as a result of the transmitted ultrasonic signal or as a result of the transmitted ultrasonic signals.

8. The method of claim 1, wherein the method is performed in a motor vehicle.

9. A non-transitory computer-readable storage medium having commands stored thereon, which when executed on a processor implement a method according to claim 1.

10. A sensor arrangement, which is configured for operation by a method according to claim 1.

11. The sensor arrangement according to claim 10, comprising ultrasonic sensor units for sending and/or receiving ultrasonic signals as the sensor units.

* * * * *